UNITED STATES PATENT OFFICE.

ADOLPH W. H. LENDERS, OF CEDAR RAPIDS, IOWA, ASSIGNOR, BY MESNE ASSIGNMENTS, TO PENICK & FORD, LTD., INCORPORATED, A CORPORATION OF DELAWARE.

FOOD PRODUCT MADE FROM CORN AND METHOD OF MANUFACTURING THE SAME.

1,391,065.   Specification of Letters Patent.   Patented Sept. 20, 1921.

No Drawing.   Application filed November 7, 1918. Serial No. 261,469.

*To all whom it may concern:*

Be it known that I, ADOLPH W. H. LENDERS, a citizen of the United States, residing at Cedar Rapids, in the county of Linn and State of Iowa, have invented certain new and useful Improvements in Food Products Made from Corn and Methods of Manufacturing the Same, of which the following is a specification.

My invention relates to a novel food product made from Indian corn, and the primary obect of the invention is to provide a product, preferably in the form of a flour, which will contain both starch and protein and will have certain desirable qualities not possessed by corn flour as heretofore manufactured. The product of my invention does not have the harshness characteristic of the ordinary dry milled corn flour. It has shortening properties, is readily digestible, very nutritious due to the protein ingredient, and may therefore be used with very considerable advantage either alone or mixed with wheat or other flour in the making of crackers, bread, maccaroni or other articles of food. The invention involves also a novel method of manufacturing the product.

I shall describe the manufacture of the product in accordance with what I now consider to be the most desirable method of procedure, having in view convenience and economy, as well as the properties of the product, and will suggest certain possible alternative steps, with the understanding, however, that further modifications might be made in the process, as will be obvious to those skilled in this general art, without departure from the principles of the invention.

In the manufacture of the product, the corn is preferably treated in accordance with the wet milling operations commonly employed in the manufacture of corn starch. That is to say, the corn is first steeped in the presence of sulfurous acid, then crushed, the germ separated out, the residue ground, and a separation made between the starchy portions of the grain and the hull and fiber. In the manufacture of starch the next step would be the tabling or equivalent operation for bringing about the separation between the starch and the protein. In making the product of this invention, I take the magma at the stage just preceding the tabling operation, and subject it to the treatment commonly employed for making thin boiling starch. Preferably the mixture of starch and protein is first filter pressed, which eliminates a considerable amount of the sulfurous acid, and is then mixed with water to a density of about 15° Baumé, and in this condition is subjected to the modifying treatment, for example, by heating in the presence of hydrochloric or other modifying acid in a vessel containing a hot water coil, or other means of imparting heat to the material. The modification of the starch ingredient of the magma may be carried to any desired extent in accordance with the character of the product to be produced. The degree of modification can be measured by means of the apparatus commonly employed for measuring the fluidity of modified or thin boiling starch. This treatment drives off the residue of the sulfurous acid, or if desired, this acid may be oxidized prior to the modifying step by means of peroxid of hydrogen or other oxidizing agent.

When the starch has been modified as above described, the modifying acid is neutralized, by carbonate of soda, for example, and is then preferably diluted to about 5° Baumé and subjected to a second filter pressing operation for the purpose of removing the salts produced by neutralizing the acid. The material is then dried in any suitable manner, for example, in vacuum driers.

The product manufactured as above described is a fine flour-like substance, quite different in its properties from the dry milled corn flour now on the market. It may be used with economy in bakery products such as crackers or other articles requiring shortening, as the flour itself has shortening powers to a greater or less degree, depending upon the extent to which the modification of the starch has been carried. When the material is mixed with water the protein does not separate from the starch. Instead the mixture is in the nature of an emulsion of both starch and protein. This property results apparently from the treatment which the material receives in the modifying step of the process.

I claim:

1. A product containing both the protein and the starch of corn, the latter being modified but not to the extent of dextrinization.

2. A product containing corn starch and protein which when mixed with water forms a mixture in the nature of an emulsion of both ingredients.

3. A starch product containing thin boiling starch and protein.

4. A starch product containing starch modified but not to the extent of dextrinization and protein which has been subjected to the same modifying treatment as the starch.

5. Method of manufacturing a product from corn which consists in removing from the corn the germ and substantially all of the hull and fiber, comminuting the remaining portions of the corn and subjecting the same to a treatment which modifies the starch without converting any substantial amount thereof into dextrin or sugar.

6. Method of manufacturing a product from corn which consists in removing from the corn the germ and substantially all of the hull and fiber, comminuting the remaining portions of the corn, and heating the same in the presence of water and an acid to modify the starch without converting any substantial amount thereof into dextrin or sugar.

7. The method of manufacturing a product from corn which consists in subjecting the grain to the wet milling process commonly employed in the manufacture of starch to produce a magma of the character ordinarily tabled, and then subjecting this magma to treatment which changes the starch to modified starch.

8. Method of manufacturing a corn product which consists in subjecting the starch and protein constituents of the grain to a treatment which modifies the starch without converting any substantial amount of the same into dextrin or sugar.

9. Method of manufacturing a corn product which consists in subjecting the starch and protein constituents of the grain, mixed with water and an acid, to heat to change the raw starch into modified starch.

10. A dry, flour-like product consisting of corn starch modified to a sub-dextrin stage, in a mixture with corn protein, which mixture remains stable when the material is suspended in water.

ADOLPH W. H. LENDERS.